(12) United States Patent
Pérez Martinez et al.

(10) Patent No.: US 9,374,737 B2
(45) Date of Patent: Jun. 21, 2016

(54) POLICY AND/OR CHARGING CONTROL

(75) Inventors: Alfonso de Jesus Pérez Martinez, Madrid (ES); Rodrigo Alvarez Dominguez, Madrid (ES); Luis Campo Giralte, Madrid (ES); Jose Rubio Vidales, Torrelodones (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 299 days.

(21) Appl. No.: 13/994,727

(22) PCT Filed: Dec. 17, 2010

(86) PCT No.: PCT/EP2010/070079
§ 371 (c)(1),
(2), (4) Date: Jun. 15, 2013

(87) PCT Pub. No.: WO2012/079647
PCT Pub. Date: Jun. 21, 2012

(65) Prior Publication Data
US 2013/0279521 A1    Oct. 24, 2013

(51) Int. Cl.
*H04W 28/24*    (2009.01)
*H04L 12/14*    (2006.01)
*H04L 12/66*    (2006.01)
*H04L 12/24*    (2006.01)
*H04M 15/00*    (2006.01)
*H04W 4/24*    (2009.01)

(52) U.S. Cl.
CPC ........... *H04W 28/24* (2013.01); *H04L 12/1407* (2013.01); *H04L 12/1492* (2013.01); *H04L 12/66* (2013.01); *H04L 41/5029* (2013.01); *H04M 15/00* (2013.01); *H04M 15/46* (2013.01); *H04M 15/66* (2013.01); *H04M 15/80* (2013.01); *H04M 15/8016* (2013.01); *H04W 4/24* (2013.01); *H04M 2215/0168* (2013.01)

(58) Field of Classification Search
None
See application file for complete search history.

(56) References Cited

U.S. PATENT DOCUMENTS

| 8,526,976 | B1 * | 9/2013 | Vargantwar | ........... H04W 68/02 |
| | | | | 455/426.1 |
| 8,605,655 | B1 * | 12/2013 | Sahai et al. | .................... 370/328 |
| 8,761,095 | B1 * | 6/2014 | O'Brien | ................ H04W 28/24 |
| | | | | 370/329 |

(Continued)

FOREIGN PATENT DOCUMENTS

| CA | 2689874 A1 | 6/2010 |
| WO | 2012/063106 A1 | 5/2012 |
| WO | 2012/065626 A1 | 5/2012 |

OTHER PUBLICATIONS

3GPP, Policy and Charging Control Architecture, Technical Specification 23.203 V9.4.0, Mar. 2010.

(Continued)

*Primary Examiner* — Jeffrey M Rutkowski
*Assistant Examiner* — Jonathan B Wood
(74) *Attorney, Agent, or Firm* — Patent Portfolio Builders PLLC

(57) ABSTRACT

The present invention relates to the implementation of policy and/or charging control for an IP Connectivity Access Network session established for a user, that enables the user to select one of several Quality or Service levels, and an associated charging rate, that can be provided to the user for an identified traffic type that is being sent over the IP-CAN session. A set of Policy and Charging Control rules that apply the selected QoS level and the associated charging rate are then generated and applied to traffic of the identified type that is sent over the IP-CAN session.

27 Claims, 4 Drawing Sheets

(56) References Cited

U.S. PATENT DOCUMENTS

| | | | |
|---|---|---|---|
| 8,787,174 B2* | 7/2014 | Riley | H04L 12/14 370/237 |
| 2003/0083041 A1 | 5/2003 | Kumar et al. | |
| 2006/0025149 A1* | 2/2006 | Karaoguz | H04N 21/4126 455/452.2 |
| 2006/0089999 A1* | 4/2006 | Xiang | H04L 63/08 709/229 |
| 2008/0153458 A1* | 6/2008 | Noldus et al. | 455/406 |
| 2009/0219946 A1* | 9/2009 | Liu | H04L 12/5695 370/437 |
| 2009/0228956 A1* | 9/2009 | He et al. | 726/1 |
| 2009/0254494 A1* | 10/2009 | Li et al. | 705/400 |
| 2010/0017846 A1* | 1/2010 | Huang et al. | 726/1 |
| 2010/0039941 A1* | 2/2010 | Tan et al. | 370/241 |
| 2010/0114943 A1* | 5/2010 | Fu | H04L 12/5695 707/769 |
| 2010/0142373 A1* | 6/2010 | Jin et al. | 370/230 |
| 2010/0150003 A1* | 6/2010 | Andreasen et al. | 370/252 |
| 2010/0287285 A1* | 11/2010 | Castellanos Zamora et al. | 709/227 |
| 2011/0035782 A1* | 2/2011 | Xia et al. | 726/1 |
| 2011/0067085 A1* | 3/2011 | Brouard et al. | 726/1 |
| 2011/0075675 A1* | 3/2011 | Koodli et al. | 370/401 |
| 2011/0122885 A1* | 5/2011 | Hedman et al. | 370/412 |
| 2011/0161504 A1* | 6/2011 | Zhou et al. | 709/227 |
| 2011/0170411 A1* | 7/2011 | Wang | H04W 76/02 370/235 |
| 2011/0211465 A1* | 9/2011 | Farrugia et al. | 370/252 |
| 2011/0270722 A1* | 11/2011 | Cai et al. | 705/34 |
| 2011/0286395 A1* | 11/2011 | Liebsch et al. | 370/328 |
| 2011/0310737 A1* | 12/2011 | Klingenbrunn | H04W 36/0044 370/235 |
| 2011/0320622 A1* | 12/2011 | Cutler et al. | 709/230 |
| 2012/0002540 A1* | 1/2012 | Siddam et al. | 370/230 |
| 2012/0030331 A1* | 2/2012 | Karampatsis | 709/223 |
| 2012/0064878 A1* | 3/2012 | Castro Castro et al. | 455/418 |
| 2012/0072585 A1* | 3/2012 | Yang et al. | 709/224 |
| 2012/0081557 A1* | 4/2012 | Kupinsky et al. | 348/207.1 |
| 2012/0099715 A1* | 4/2012 | Ravishankar et al. | 379/114.01 |
| 2012/0100849 A1* | 4/2012 | Marsico | H04W 28/24 455/432.1 |
| 2012/0117220 A1* | 5/2012 | Mariblanca Nieves | 709/223 |
| 2012/0124220 A1* | 5/2012 | Zhou et al. | 709/227 |
| 2012/0136992 A1* | 5/2012 | Lopez Nieto et al. | 709/224 |
| 2012/0147824 A1* | 6/2012 | Van der Merwe | H04W 84/02 370/329 |
| 2012/0195196 A1* | 8/2012 | Ghai et al. | 370/235 |
| 2012/0210003 A1* | 8/2012 | Castro et al. | 709/225 |
| 2012/0220330 A1* | 8/2012 | Goldner et al. | 455/517 |
| 2012/0314632 A1* | 12/2012 | Martinez De La Cruz et al. | 370/310 |
| 2013/0044645 A1* | 2/2013 | Castro Castro et al. | 370/259 |

OTHER PUBLICATIONS

3GPP, Policy and Charging Control over Gx Reference Point (Release 9), Technical Specification 29.212 V9.2.0, Mar. 2010.
3GPP, Policy and Charging Control over Rx Reference Point (Release 9), Technical Specification 29.214 V9.2.0, Dec. 2009.
IETF, Diameter Credit-Control Application, Request for Comments 4006. Aug. 2005.
EPO, Int'l Search Report in PCT/EP2010/070079, May 25, 2011.
EPO, Written Opinion in PCT/EP2010/070079, May 25, 2011.
EPO, Written Opinion in PCT/EP2010/070079, Nov. 15, 2012.
EPO, Int'l Preliminary Report on Patentability in PCT/EP2010/070079, Mar. 1, 2013.
3GPP, Policy and Charging Control Architecture, Technical Specification 23.203 V10.1.0, Sep. 2010.
3GPP, Policy and Charging Control over Gx Reference Point (Release 9), Technical Specification 29.212 V9.4.1, Oct. 2010.
3GPP, Charging Architecture and Principles (Release 9), Technical Specification 32.240 V9.1.0, Jun. 2010.
Allot Communications et al., TDF: TS 23.203 Section 7 Modifications, Tdoc S2-105695, Nov. 15, 2010, 3GPP TSG SA WG2 Meeting #82, Jacksonville, FL, US.

* cited by examiner

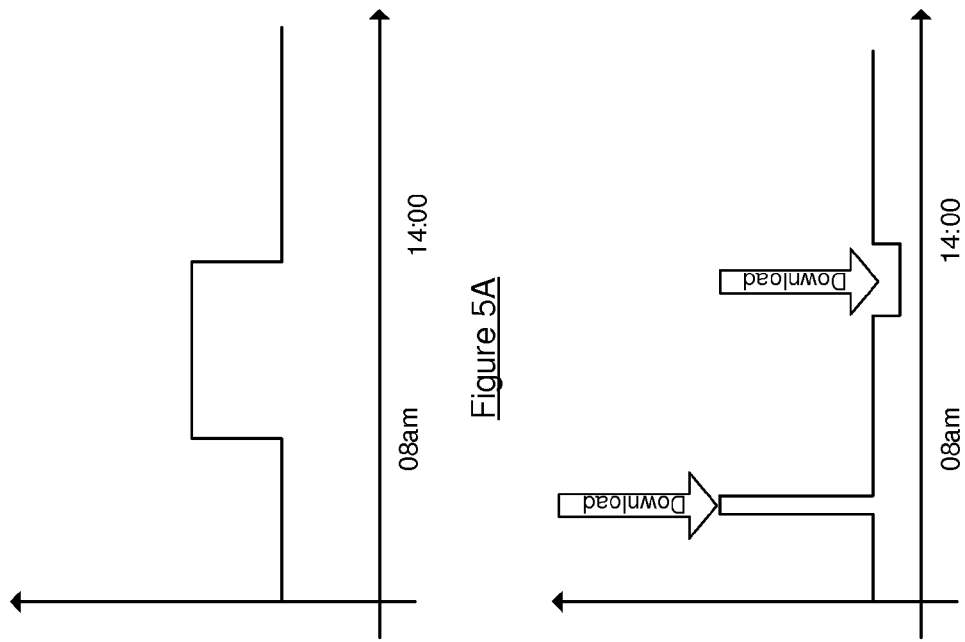
Figure 5A
Figure 5B
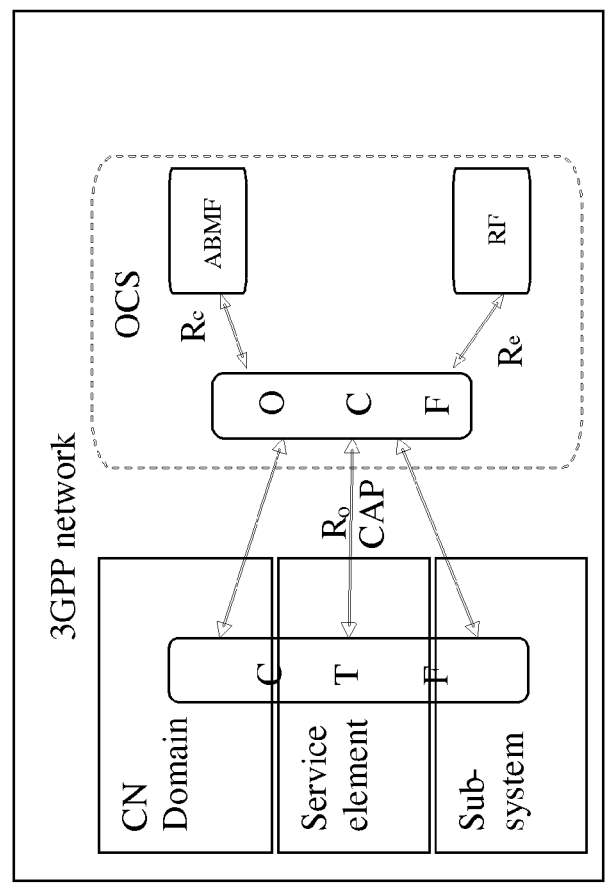
Figure 2

POLICY AND/OR CHARGING CONTROL

TECHNICAL FIELD

The present invention relates to the implementation of policy and/or charging control for an IP Connectivity Access Network session. More particularly, the invention relates to user interactive policy and/or charging control for an IP Connectivity Access Network session.

BACKGROUND

Telecommunications services provided over an IP Connectivity Access Network (IP-CAN) can be subject to charging and policy control mechanisms. This includes service-aware Quality of Service (QoS) control. Accordingly, some telecommunications systems incorporate Policy and Charging Control (PCC) architectures to provide this control. 3GPP TS 23.203 describes such a PCC architecture in respect of packet flows in an IP-CAN session established by a user terminal through an Evolved 3GPP telecommunications system, including both 3GPP accesses (GERAN/UTRAN/E-UTRAN) and Non-3GPP accesses. FIG. 1 illustrates schematically an example of the PCC architecture described in 3GPP TS 23.203 that comprises a Policy and Charging Enforcement Function (PCEF), a Policy and Charging Rules Function (PCRF), an Application Function (AF), an Online Charging System (OCS), an Offline Charging System (OFCS) and a Subscription Profile Repository (SPR). The architecture can also include a Bearer Binding and Event Reporting Function (BBERF).

The PCRF is a functional element that encompasses policy control decision and flow based charging control functionalities, a combination of the functionality of the Policy Decision Function (PDF) and the Charging Rule Function (CRF) defined in release 6 of the 3GPP specification. A PCRF can be implemented as a standalone node and behaves as a Policy Decision Point (PDP), or Policy Server (PS), that stores user data related to QoS enforcement, access control lists, etc. The PCRF provides policy and charging control for the media components negotiated between the user terminal and the AF. The PCRF receives session and media related information from the AF and informs the AF of traffic plane events. The PCRF also provides network control regarding the service data flow detection, gating, QoS and flow based charging (except credit management) towards the PCEF. The PCRF can provision PCC rules and PCC decisions to the PCEF via a so-called Gx reference point and to the BBERF through a so-called Gxa/Gxc (also referred to as Gxx) reference point. The PCRF also forwards events between the BBERF, the PCEF, and the AF. Criteria such as the QoS subscription information may be used together with policy rules such as service-based, subscription-based, or pre-defined PCRF internal policies to derive the authorized QoS to be enforced for a service data flow. The PCRF PCC decisions may be based on one or more of the following:
- information obtained from the AF via a so-called Rx reference point, e.g. the session, media and subscriber related information;
- information obtained from the PCEF via the Gx reference point, e.g. IP-CAN bearer attributes, request type, subscriber related information and location information;
- information obtained from the SPR via a so-called Sp reference point, e.g. subscriber and service related data;
- information pre-defined in the PCRF; and
- information obtained from BBERF via the Gxa/Gxc (also referred to as Gxx) reference points.

The PCEF is a functional entity that behaves as a Policy Enforcing Point (PEP) for enforcing decisions instructed by the PCRF and the OCS. The PCEF provides service data flow detection (based on service data flow filters defined in the PCC rules) to capture and analyse any user and signalling traffic, to identify the user and to capture details of the service(s) being used. The PCEF can then communicate this user and access-specific information to the PCRF over the Gx interface, to the OCS over a so-called Gy interface and to the OFCS over a so-called Gz interface. The PCEF enforces QoS control according to the QoS authorised by the PCRF. The PCEF is preferably co-located within a gateway node implementing the IP access to a Packet Data Network (PDN GW). As such, in a GPRS core network the PCEF is located within a GPRS Gateway Support Node (GGSN), whilst in the case of a CDMA2000 network the PCEF may be located in a Packet Data Serving Node (PDSN), and in a WLAN network the PCEF may be located in a Packet Data Gateway (PDG).

The BBERF supports a subset of the functions provided by the PCEF that includes bearer binding, uplink bearer binding verification and event reporting to the PCRF. Bearer binding is the association of a PCC rule and a QoS rule (if applicable) to an IP CAN bearer within that IP CAN session, and is performed by the Bearer Binding Function (BBF). The BBF is located at the PCEF if GTP is used as the mobility protocol towards the PCEF. Otherwise, where a mobile-IP based protocol, such as MIP, is used instead of GTP, the BBF is located at the BBERF. The QoS rules contain the information from the PCC rules that the BBERF requires to ensure that bearer binding can be performed. The QoS rules therefore contain the SDF template and precedence information, as well as the QoS information (e.g. QCI, bit rates etc). The PCRF provides the BBERF with the QoS rules derived from the PCC rules. The BBERF then enforces the QoS decisions by setting up the appropriate bearers. The Gxx reference point represents the Gxa or Gxc reference points as applicable in each particular context. Gxc applies when the BBERF is located in the S-GW of a 3GPP access, whereas Gxa applies when the BBERF is located in a trusted non-3GPP access.

The AF is an element offering applications that require policy and/or charging control of the IP-CAN user plane behaviour. The AF communicates with the PCRF over the Rx interface to transfer dynamic session information (e.g. a description of the media to be delivered in the transport layer) required for PCRF decisions, as well as to receive IP-CAN specific information and notifications about IP-CAN bearer level events. One example of an AF is the P-CSCF of the IP Multimedia Core Network (IM CN) subsystem. In the case of a P-CSCF, the information communicated over the Rx interface is derived from the P-CSCF session information (e.g. SDP when SIP is used for signalling) and it mainly includes media components. A media component comprises a set of IP flows, each of which is described by a 5-tuple, the media type and required bandwidth. The AF can also subscribe to certain events that occur at the traffic plane level (i.e., events detected by either the PCEF or be BBERF). Those traffic plane events include events such as IP session termination or access technology-type change. When the AF has subscribed to a traffic plane event, the PCRF informs the AF of its occurrence.

The SPR contains all subscriber/subscription related information needed for subscription-based policies and IP-CAN bearer level PCC rules by the PCRF. The Sp interface allows the PCRF to request subscription information related to the IP-CAN transport level policies from the SPR based on a subscriber ID and other IP-CAN session attributes.

The OCS provides authorization for the usage of network resources based on the provisioned data and the user activity information it receives from PCEF. This authorization must be granted by the OCS prior to the actual resource usage. When receiving a network resource usage request, the network assembles the relevant charging information and generates a charging event towards the OCS in real-time. The OCS then returns an appropriate resource usage authorization over the Gy interface. The resource usage authorization may be limited in its scope (e.g. volume of data or duration) therefore this authorization may have to be renewed from time to time as long as the user's resource usage persists. The OCS can support time, volume and event-based charging.

FIG. 2 illustrates schematically the online charging architecture as described in 3GPP TS 32.240. In this architecture, network resource usage requests are sent to a Charging Trigger Function (CTF). The CTF is a mandatory integrated component of all network elements that are involved in online charging. The CTF assembles the relevant charging information and generates an online charging event that is transferred to the Online Charging Function (OCF) within the Online Charging System (OCS) in real-time using a so-called Ro reference point. The OCF then returns an appropriate resource usage authorization based on subscriber account information. This resource usage authorization may be limited in its scope (e.g. volume of data or duration), and may therefore have to be renewed from time to time as long as the subscriber's network resource usage persists. If required by the operator, Charging Data Records (CDRs) may additionally be generated for online charged subscribers. The OCF includes the Session Based Charging Function (SBCF/SCF) and the Event Based Charging Function (EBCF/ECF). The SBCF is responsible for online charging of network/user sessions, e.g. voice calls, IP CAN bearers, IP CAN session or IMS sessions. The EBCF performs event-based online charging (often referred to as "content charging") in conjunction with any application server or service NE, including SIP application servers.

The introduction of new mobile devices, such as smartphones, that offer advanced capabilities, has lead to an explosion in mobile traffic, as the features of these devices allow users to download and make use of a large variety of applications that have in-turn increased demand for services such as video streaming. The increased use of such data-intensive features is forcing network operators to abandon flat-rate service plans, in favour of subscriptions that charge users based on their network resource usage. In doing so, network operators aim to ensure that the costs of improving their network infrastructures to provide sufficient bandwidth is covered by revenues made from those users that consume it. The current methods of charging users for their network resource usage rely on charging the user based on the volume of data consumed, irrespective of the bandwidth used to transfer the data. As a result, most mobile network operators will apply policies that limit the maximum bandwidth available to users of the network.

It has been recognised here that it would be advantageous to both network operators and users if, at any time, the user could select the bandwidth that they wish to use and be charged according to both the volume of data consumed and the bandwidth used to transfer that data. By way of example, this would allow a user to minimise the cost of their regular network resource usage by choosing a relatively low cost tariff that provides the user with a maximum bandwidth of 100 Kbps. If the same user then wants to download a large file, such as a movie, the user can choose to increase their maximum available bandwidth to 200 Mbps for the duration of the download, with the cost of this network resource usage being determined by a different, comparatively high cost tariff.

However, the current charging architectures do not provide mechanisms for implementing such flexible, user interactive policy control and charging.

According to current standards, a PCEF can detect that a user wants to download a particular file, can request that the OCS charge for the downloading of this file at a particular charging rate, and can enforce QoS control so as to allow a particular bandwidth. However, there is no mechanism by which the user can select the bandwidth that is to be used. Nor is there a mechanism that allows the rate at which the downloading of this file is to be charged to be determined based upon the bandwidth provided to the user.

Whilst there are some methods by which limited interactive charging could be implemented, these methods do not provide a mechanism of truly interactive charging. For example, an Advice of Charge (AoC) Function allows users to be aware of an exhausted quota and thus the possibility to recharge the quota, or even to pay an extra fee for a specific item of content that can be obtained using the HTTP protocol. The cost of this extra fee could be varied by the AoC Function by including a token in the URL. The PCEF could then determine the bandwidth to be applied based on that URL. However, this implies that only content from an internal web server, and that can be provided using HTTP, could be charged at a rate that depends on the bandwidth used. Furthermore, this would also require that PCEF be configured with a huge list of URLs and the associated bandwidth that is to be allowed. The burden of initially configuring and maintaining this list makes such an approach infeasible. In addition, such a solution would not allow the user the flexibility to be able to select the bandwidth and charging rate for specific files (e.g. it would be unlikely that a user would be able to download one mp3 file at a particular bandwidth and charging rate, and subsequently download another mp3 with at a different bandwidth and charging rate), and the AoC Function would not be able to charge an extra fee for Internet services (as VoIP calls, P2P, Online TV).

SUMMARY

It is therefore an aim of the present invention to provide method and apparatus that enables a user to interactively select a Quality of Service that they wish to use for some specific type of traffic, and thereby also select a charging rate associated with the Quality of Service.

According to a first aspect of the present invention there is provided a method of operating a Policy and Charging Enforcement Function responsible for enforcing Policy and Charging Control Rules for an IP Connectivity Access Network, IP-CAN, session established for a user. The method comprises the step of:

enforcing first Policy and Charging Control rules for the IP-CAN session;

for traffic sent over the IP-CAN session, identifying the type of traffic;

notifying a Quality of Service selection function of an identity of the user and the type of traffic;

receiving from a Policy and Charging Rules Function, second Policy and Charging Control rules for the user that apply one of a plurality of Quality of Service levels and an associated charging rate for the identified traffic type that have been selected by the user using the Quality of Service selection function; and enforcing the second Policy and Charging Control rules for the IP-CAN session, and in accordance with the second Policy and Charging Control rules, allowing the selected Quality of Service level for the identified traffic type and notifying a charging server that the associated charging rate is applicable for the identified traffic type.

A Quality of Service level defines one or more Quality of Service parameters that may include any of:
- a Quality of Service class identifier;
- a maximum bandwidth allowed for the uplink direction;
- a maximum bit rate allowed for the uplink direction;
- a maximum bandwidth allowed for the downlink direction;
- a maximum bit rate allowed for the downlink direction;
- a guaranteed bit rate allowed for the uplink direction; and
- a guaranteed bit rate allowed for the downlink direction.

The Policy and Charging Rules Function may also indicate a time period for which the second Policy and Charging Control rules should be applied. If the Policy and Charging Rules Function does indicate such a time period, then the second Policy and Charging Control rules are removed when the time period indicated by the Policy and Charging Rules Function has expired.

The type of traffic may be identified using one or more of packet inspection, and heuristic analysis. The charging server may be part of an Online Charging System.

According to a second aspect of the present invention there is provided a method of operating an apparatus to provide a Quality of Service selection function. The method comprises the steps of:
- receiving from a Policy and Charging Enforcement Function, an identity of a user and a type of traffic associated with the user;
- notifying the user of a plurality of Quality of Service levels that can be provided to the user for the identified traffic type and a charging rate associated with each Quality of Service level;
- receiving a user selection of one of the plurality of Quality of Service levels; and
- notifying a Policy and Charging Rules Function of an identity of the user, the selected Quality of Service level, the associated charging rate and the identified traffic type.

The notification sent to the Policy and Charging Rules Function may also indicates a time period for which the selected Quality of Service level and the associated charging rate should be applied.

The server may communicate with the Policy and Charging Rules Function over a Lightweight Directory Access Protocol, LDAP, interface.

According to a third aspect of the present invention there is provided a method of operating a Policy and Charging Rules Function responsible for determining Policy and Charging Control Rules for an IP Connectivity Access Network, IP-CAN, session established for a user. The method comprises the steps of:
- receiving, from a Quality of Service selection function, a notification that includes a Quality of Service level that is to be provided to the user for an identified type of traffic together with an associated charging rate that is to be applied to the identified traffic type;
- generating Policy and Charging Control rules for the IP-CAN session that apply the Quality of Service level and the associated charging rate for the identified traffic type; and
- sending the Policy and Charging Control rules to a Policy and Charging Enforcement Function responsible for enforcing the Policy and Charging Control Rules for the IP-CAN session.

The notification may also indicate a time period for which the Quality of Service level and the associated charging rate should be applied.

The step of sending the Policy and Charging Control rules to a Policy and Charging Enforcement Function may include indicating to the Policy and Charging Enforcement Function that the Policy and Charging Control rules should only be applied for the duration of the time period.

The Policy and Charging Rules Function may communicates with the Quality of Service selection function over a Lightweight Directory Access Protocol, LDAP, interface.

According to a fourth aspect of the present invention there is provided a method of operating a user equipment. The method comprises the steps of:
- establishing an IP Connectivity Access Network, IP-CAN, session;
- causing traffic of a particular type to be sent over the IP-CAN session;
- receiving from a Quality of Service selection function, a notification of a plurality of Quality of Service levels that can be provided to for the traffic type and a charging rate associated with each Quality of Service level;
- accepting user selection of one of the plurality of Quality of Service levels; and
- informing the Quality of Service selection function of the user selection.

The user equipment may communicate with the Quality of Service selection function over a Hypertext Transfer Protocol, HTTP, interface.

According to a fifth aspect of the present invention there is provided an apparatus configured to operate as a Policy and Charging Enforcement Function responsible for enforcing Policy and Charging Control Rules for an IP Connectivity Access Network, IP-CAN, session established for a user. The apparatus comprises:
- a rule enforcement unit for enforcing first Policy and Charging Control rules for the IP-CAN session;
- a traffic inspection unit for identifying a type of traffic sent over the IP-CAN session;
- a transmitter for notifying a Quality of Service selection function of an identity of a user and the identified traffic type; and
- a receiver for receiving second Policy and Charging Control rules for the user from a Policy and Charging Rules Function, the second Policy and Charging Control rules applying one of a plurality of Quality of Service levels and an associated charging rate for the identified traffic type that have been selected by the user using the Quality of Service selection function;
- wherein the rule enforcement unit is arranged to enforce the second Policy and Charging Control rules for the IP-CAN session, and in accordance with the second Policy and Charging Control rules, to allow the selected Quality of Service level for the identified traffic type and to notify a charging server that the associated charging rate is applicable for the identified traffic type.

The rule enforcement unit may be further arranged to allow one or more Quality of Service parameters defined by the selected Quality of Service level. The rule enforcement unit may be further arranged to allow one or more Quality of Service parameters that include any of:
- a Quality of Service class identifier;
- a maximum bandwidth allowed for the uplink direction;
- a maximum bit rate allowed for the uplink direction;
- a maximum bandwidth allowed for the downlink direction;
- a maximum bit rate allowed for the downlink direction;
- a guaranteed bit rate allowed for the uplink direction; and
- a guaranteed bit rate allowed for the downlink direction.

The rule enforcement unit may be further arranged to remove the second Policy and Charging Control rules when a time period indicated by the Policy and Charging Rules Function has expired.

According to a sixth aspect of the present invention there is provided an apparatus configured to provide a Quality of Service selection function. The apparatus comprises:
a receiver for receiving an identity of a user and a type of traffic associated with the user from a Policy and Charging Enforcement Function;
a Quality of Service determination unit for determining a plurality of Quality of Service levels that can be provided to the user for the traffic type and a charging rate associated with each Quality of Service level;
a transmitter for notifying the user of the plurality of Quality of Service levels and the associated charging rates;
a receiver for receiving a user selection of one of the plurality of Quality of Service levels; and
a transmitter for notifying a Policy and Charging Rules Function of an identity of the user, the selected Quality of Service level, the associated charging rate and the traffic type.

The Quality of Service determination unit may be further arranged to determine a plurality of Quality of Service levels that each define one or more Quality of Service parameters. The Quality of Service determination unit may be further arranged to determine a time period for which the selected Quality of Service level and the associated charging rate should be applied.

The apparatus may further comprise a database for storing data from which the plurality of Quality of Service levels and associated charging rates can be determined. The database may be arranged to store at least one or more user identities, the traffic types associated with each user identity, the Quality of Service levels that can be provided for each traffic type and a charging rate associated with each Quality of Service level. The database may be arranged to store data that includes a plurality of Quality of Service levels that each define one or more Quality of Service parameters.

The apparatus may be configured to communicate with the Policy and Charging Rules Function over a Lightweight Directory Access Protocol, LDAP, interface.

According to a seventh aspect of the present invention there is provided an apparatus configured to operate as a Policy and Charging Rules Function responsible for determining Policy and Charging Control Rules for an IP Connectivity Access Network, IP-CAN, session established for a user. The apparatus comprises:
a receiver for receiving, from a Quality of Service selection function, a notification that includes a Quality of Service level that is to be provided to the user for an identified type of traffic together with an associated charging rate that is to be applied to the identified traffic type;
a rule generation unit for generating Policy and Charging Control rules for the IP-CAN session that apply the Quality of Service level and the associated charging rate for the identified traffic type; and
a transmitter for sending the Policy and Charging Control rules to a Policy and Charging Enforcement Function responsible for enforcing the Policy and Charging Control Rules for the IP-CAN session.

The rule generation unit may be further arranged to generate an indicator that the Policy and Charging Control rules should only be applied for the duration of a time period. The rule generation unit may be further arranged to generate Policy and Charging Control rules that apply one or more Quality of Service parameters that are defined by the Quality of Service level. The rule generation unit may be further arranged to generate Policy and Charging Control rules that apply one or more Quality of Service parameters that include any of:
a Quality of Service class identifier;
a maximum bandwidth allowed for the uplink direction;
a maximum bit rate allowed for the uplink direction;
a maximum bandwidth allowed for the downlink direction;
a maximum bit rate allowed for the downlink direction;
a guaranteed bit rate allowed for the uplink direction; and
a guaranteed bit rate allowed for the downlink direction.

The receiver may be further arranged to receive, from a Quality of Service selection function, an indication of a time period for which the Quality of Service level and the associated charging rate should be applied. The receiver may be further arranged to communicate with the Quality of Service selection function over a Lightweight Directory Access Protocol, LDAP, interface.

According to an eighth aspect of the present invention there is provided a user equipment device comprising:
a communication unit for establishing an IP Connectivity Access Network, IP-CAN, session and for causing traffic of a particular type to be sent over the IP-CAN session;
a receiver for receiving from a Quality of Service selection function, a notification of a plurality of Quality of Service levels that can be provided to a user of the user equipment for the traffic type and a charging rate associated with each Quality of Service level;
a user interfacing unit for implementing and accepting user selection of one of the plurality of Quality of Service levels; and
a transmitter for informing the Quality of Service selection function of the selected Quality of Service level.

The user interfacing unit may be further arranged to implement and accept user selection of a Quality of Service level that defines one or more Quality of Service parameters. The user interfacing unit may be further arranged to implement and accept user selection of a Quality of Service level that defines one or more Quality of Service parameters that include any of:
a Quality of Service class identifier;
a maximum bandwidth allowed for the uplink direction;
a maximum bit rate allowed for the uplink direction;
a maximum bandwidth allowed for the downlink direction;
a maximum bit rate allowed for the downlink direction;
a guaranteed bit rate allowed for the uplink direction; and
a guaranteed bit rate allowed for the downlink direction.

BRIEF DESCRIPTION OF THE DRAWINGS

FIG. 2 illustrates schematically the online charging architecture in accordance with 3GPP TS 32.240;
FIG. 5A illustrates the bandwidth limitations of a standard subscription;
and
FIG. 5B illustrates the bandwidth limitations that could be provided using interactive policy and charging control mechanisms.

DETAILED DESCRIPTION

In order to overcome the limitations identified above there will now be described a method of implementing policy and/ or charging control for an IP Connectivity Access Network session between a user's user equipment (UE) and an IP network. According to this method, the Policy and Charging Control (PCC) architecture identifies a type of traffic that is being sent over the IP-CAN session. The user is then notified of a plurality of Quality or Service (QoS) levels that can be provided to the user for the identified traffic type, together with a charging rate/tariff that is associated with each QoS level. The user then selects one of the plurality of QoS levels that they would like to be applied to the traffic, and thereby also selected the associated charging rate/tariff. The PCC architecture then generates and enforces a set of Policy and Charging Control (PCC) rules that apply the selected QoS level, and the associated charging rate/tariff, to traffic of the identified type that is sent over the IP-CAN session.

Figure 1:
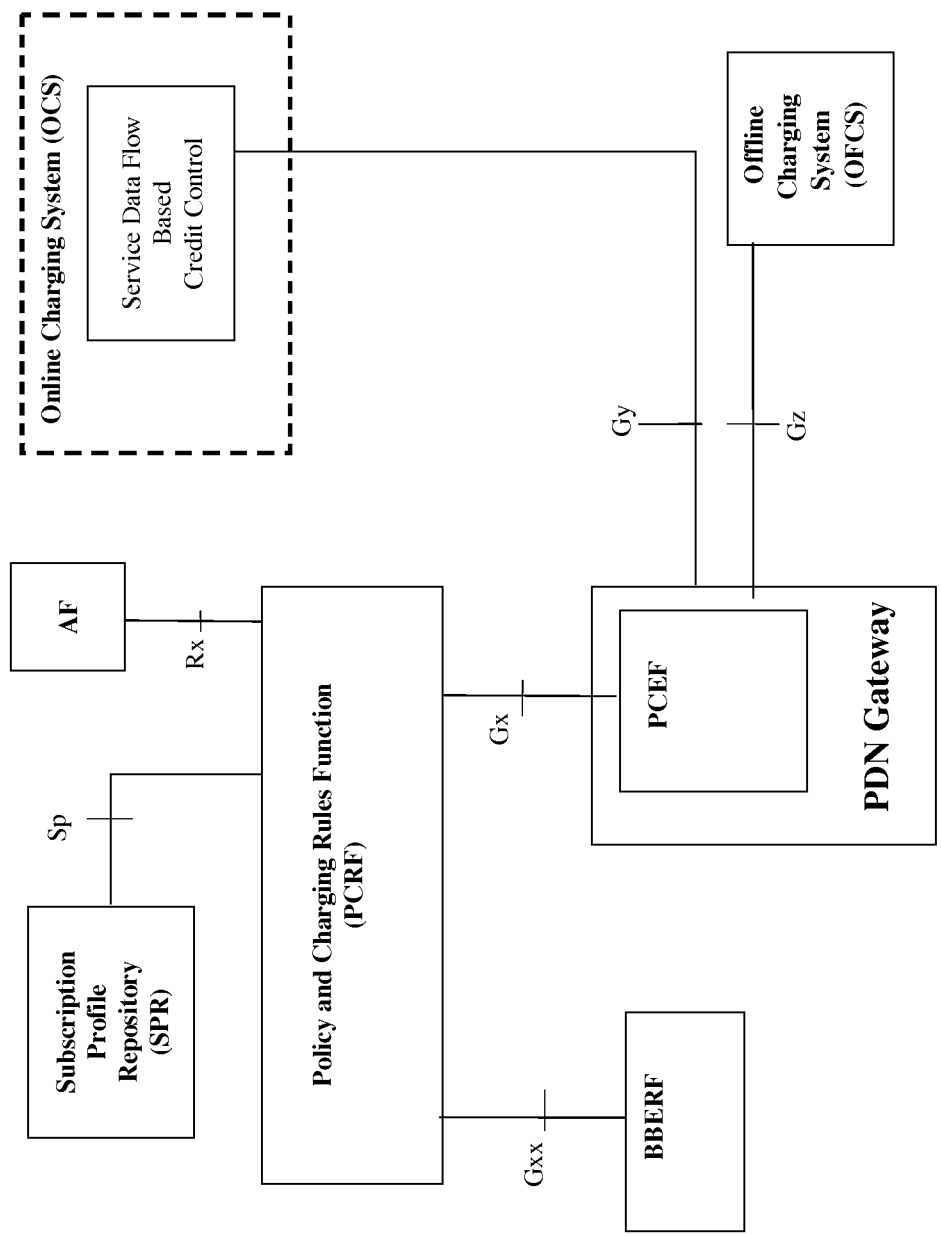
FIG. 1 illustrates schematically an example of PCC architecture in accordance with 3GPP TS 23.203.
Figure 3:
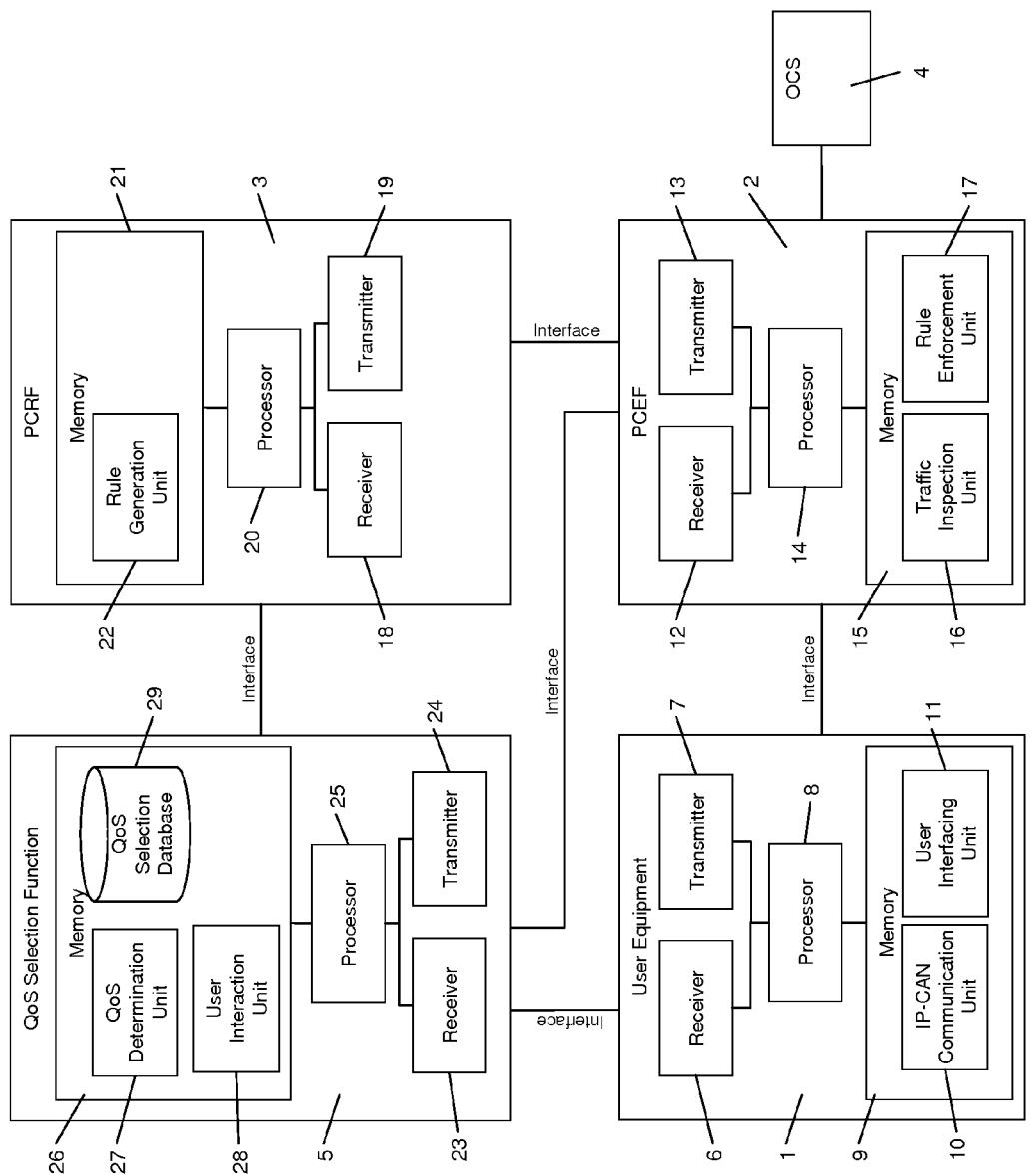
FIG. 3 illustrates schematically an embodiment of a modified PCC architecture.

FIG. 3 illustrates schematically components of a modified user equipment (UE) 1 and a modified PCC architecture suitable for implementing user interactive policy and charging control. Each of these components/functions can be implemented as a combination of computer hardware and software. The modified PCC architecture comprises a PCEF entity 2, a PCRF entity 3, an OCS 4 and a new component referred to as a user interactive Quality of Service (QoS) Selection Function entity 5 that enables a user to select the QoS that is to be applied for traffic sent over the IP-CAN session.

The UE 1 comprises a receiver 6, a transmitter 7, a processor 8 and a memory 9. The memory 9 stores the various programs/executable files that are implemented by the processor, and also provides a storage unit for any required data. The programs/executable files stored in the memory, and implemented by the processor, include an IP-CAN Communication Unit 10 and a User Interfacing Unit 11.

The PCEF entity 2 comprises a receiver 12, a transmitter 13, a processor 14 and a memory 15. The memory 15 stores the various programs/executable files that are implemented by the processor, and also provides a storage unit for any required data. The programs/executable files stored in the memory, and implemented by the processor, include a Traffic Inspection Unit 16 and a Rule Enforcement Unit 17. Typically, the PCEF entity 2 can be implemented within a gateway node implementing the IP access to the Packet Data Network (PDN GW), or within a GPRS Gateway Support Node (GGSN).

The PCRF entity 3 comprises a receiver 18, a transmitter 19, a processor 20 and a memory 21. The memory 21 stores the various programs/executable files that are implemented by the processor, and also provides a storage unit for any required data. The programs/executable files stored in the memory, and implemented by the processor, include a Rule Generation Unit 22. The PCRF entity 3 can be implemented as a standalone node.

The QoS Selection Function entity 5 comprises a receiver 23, a transmitter 24, a processor 25 and a memory 26. The memory 26 stores the various programs/executable files that are implemented by the processor, and also provides a storage unit for any required data. The programs/executable files stored in the memory, and implemented by the processor, include a QoS Determination Unit 27 and a User Interaction Unit 28. The memory also stores a QoS Selection Database 29. The QoS Selection Function entity 5 can be implemented as a standalone node or server.

Figure 4:
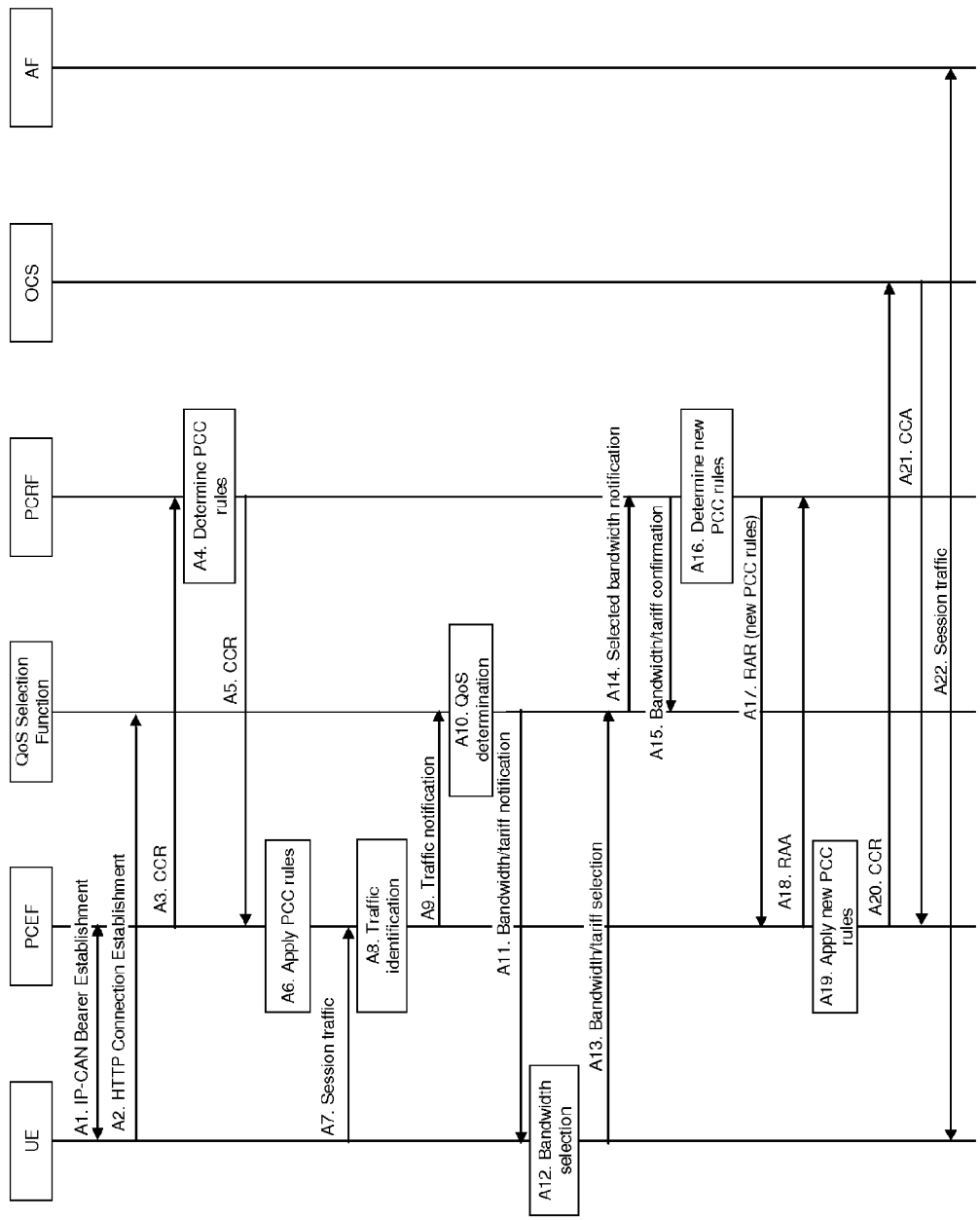
FIG. 4 is an example signalling flow diagram illustrating the process of implementing interactive charging for a user.

FIG. 4 is an example signalling flow diagram illustrating the process of implementing interactive charging for a user. The steps performed are as follows:

A1. A bearer is established between the UE 1 and the IP-CAN via a gateway node providing the PCEF 2. This requires either establishing a first IP-CAN session at a PCEF 2 or modifying an existing IP-CAN session.

A2. Depending upon how it is intended that the QoS Selection Function 5 will communicate with the UE 1, the UE 1 may be required to establish a HTTP connection with a web server provided by the QoS Selection Function 5. However, this step is optional and might be required depending on the method of communication used between the QoS Selection Function and the UE 1 (see A11).

A3. Upon receipt of a request to establish a communication session from the UE 1, the PCEF 2 sends a Diameter Credit Control Request (CCR) message to the PCRF 3 in order to request PCC rules for the session.

A4. The PCRF Rule Generation Unit 22 determines a set of PCC rules applicable to the IP-CAN session according to standardised procedures.

A5. The PCRF 3 responds to the PCEF 2 with a Diameter Credit Control Answer (CCA) message including the PCC rules.

A6. The PCEF 2 receives the CCA message and begins applying the PCC rules to the session using the Rule Enforcement Unit 17.

A7. The UE 1 then attempts to consume some traffic over the IP-CAN session. For example, the UE 1 may attempt to access a service provided by an AF, such as video streaming service.

A8. The Traffic Inspection Unit 16 at the PCEF 2 uses Deep Packet Inspection (DPI) techniques to identify the type of traffic that is being sent over the IP-CAN session. For example, the PCEF 2 may identify the traffic as relating to Instant Messaging, HTTP files, FTP download, P2P files, Online TV, radio, etc.

A9. The PCEF 2 notifies the QoS Selection Function 5 of an identity of the user and the type of traffic that the user is attempting to consume. The PCEF may be configured to notify the QoS Selection Function for all traffic, or may be configured to notify the QoS Selection Function only for certain types of traffic or content. The dialog between PCEF and QoS Selection Function may be based on Lightweight Directory Access Protocol (LDAP), which may also be used for the dialog between PCRF and QoS Selection Function.

A10. The QoS Determination Function 27 of the QoS Selection Function 5 then identifies a plurality of different QoS levels that can be provided to the user for this traffic. Each QoS level defines one or more QoS parameters. For example, these parameters can include one or more of a an Allocation & Retention Priority, a Quality of Service Class Identifier, a maximum bit rate/bandwidth allowed for the uplink direction, a maximum bit rate allowed for the downlink direction, a guaranteed bit rate allowed for the uplink direction and a guaranteed bit rate allowed for the downlink direction. The QoS Determination Function also identifies a tariff/charging rate associated with each QoS level.

A11. The QoS Selection Function 5 then makes use of the User Interacting Unit 28 to notify the UE 1 of the plurality of different QoS levels and the tariff/charging rate associated with each QoS level. By way of example, this notification may be implemented using the HTTP server push mechanism. To do so, the UE 1 will have been required to establish a HTTP connection to a web server provided by the User Interaction Function 28, as per step A2. Alternatively, this notification could be implemented using the Java pushlet, wap-push or SMS/MMS-push mechanisms.

A12. The User Interfacing Unit 11 of the UE 1 then implements and accepts a user selection of one of the plurality of QoS levels and the associated tariff/charging rate that is to be used for this traffic.

A13. The UE 1 responds to the QoS Selection Function 5 indicating the selection.

A14. The QoS Selection Function 5 then sends a message to the PCRF 3 notifying it of the user's identity, the user's selected QoS level and the selected tariff/charging rate. For example, the QoS Selection Function 5 could send a ModifyRequest LDAP message via an LDAP interface. This message contains the selected QoS level, the tariff/charging rate to be applied and also identifies the traffic/content type to which this selection applies. Optionally, the message may also indicate the time for which the selected QoS level will be applied. If no time is indicated, then the selected QoS level will be applied until consumption of the identified traffic/content type is complete (e.g. a download is complete, or a streaming service ended etc).

A15. The PCRF 3 responds to this request confirming the changes. For example, the PCRF 3 could send a ModifyResponse LDAP message to the QoS Selection Function. In addition, the PCRF 3 could also save information about this request in its memory. For example, the PCRF 3 may increment a counter indicating the number of times this user has selected this QoS level/charging rate for this traffic/content type. This information may then be used for marketing purposes (e.g. blocks or discounts for consecutive downloads at a specific rate).

A16. The Rule Generation Unit 22 of the PCRF 3 then determines new PCC rules, taking into account the QoS level, the tariff/charging rate and the traffic/content type identified in the message from the QoS Selection Function. The new PCC rules will apply the selected QoS level, a rating group and a set of rules that can be used to classify the traffic.

A17. The PCRF 3 then sends the new PCC rules to the PCEF 2 in a Diameter Reauthorization Request (RAR) message. Optionally, the PCRF 3 could also notify the PCEF 2 of the time for which new PCC rules are to be applied.

A18. The PCEF 2 responds to the PCRF with a Diameter Reauthorization Answer (RAA) to acknowledge the RAR message.

A19. The Rule Enforcement Unit 17 of the PCEF 2 then begins enforcing the new PCC rules received from the PCRF 3, applying the selected QoS level to traffic of the identified type that is sent over the IP-CAN session.

A20. The PCEF 2 also sends a CCR message to the OCS 4 to notify it of the rating group that is to be used when charging for traffic of the identified type that is sent over the IP-CAN session.

A21. The OCS 4 responds to the PCEF 2 with a CCA message, acknowledging the CCR message, and including an appropriate resource usage authorization.

A22. Traffic sent over the IP-CAN session (e.g. to or from the UE) is inspected by the Traffic Inspection Function 16 of the PCEF 2, and the new PCC rules are enforced for any traffic that is of the type identified in the new PCC rules. As such, the PCEF 2 allows this traffic to be provided with the selected QoS level in accordance with the new PCC rules, and the OCS applies the associated charging rate for this traffic.

As described above, as well as providing the new PCC rules, the PCRF 3 can also notify the PCEF 2 of a time period for which the new PCC rules should be applied. Once this time has expired, the PCEF 2 will remove the new PCC rules and revert to any previously installed PCC rules, and thereby allows the PCRF 3 to limit the time for which the QoS level selected by the user is implemented. This time period can be indicated to the PCRF 3 by the QoS Selection Function 5 when notifying the PCRF 3 of the user selection. For example, when the user is notified of the plurality of QoS levels that can be provided for the identified traffic type, one or more of these QoS levels can also include an indication of a maximum time period for which the QoS level can be applied. Alternatively, when interacting with the user, the QoS Selection Function can allow the user to select a QoS level, and then select a maximum time period for which this QoS level is to be applied. In doing so, these methods can be used to limit the cost incurred by the user and/or the length of duration for which network resources are reserved for the user.

If the PCRF 3 does not indicate a time for which the new PCC rules are to be applied, then the PCEF 2 can use various protocol indications to detect that consumption of the identified traffic/content type has ended (e.g. a download has been completed or a service terminated). The PCEF 2 will then remove the new PCC rules and revert to any previously installed PCC rules, thereby reverting to the previously allowed QoS level.

To do so, the PCEF 2 will be required to detect the beginning and the end of the traffic consumption of a particular service. This can be achieved using information obtained from the application layer and/or the transport layer functions. For example, the beginning and end of a download using the Hypertext Transfer Protocol (HTTP) protocol can easily be detected by identifying responses to a HTTP GET request. A HTTP GET request is used to retrieve data identified by the Request-URI. A response including a status code "200" indicates that the HTTP download has started, and will also indicate the size of the data (i.e. Content-Length) that is being downloaded. The PCEF can then determine that the download has been completed by identifying every response to a HTTP GET request, until the size of the data downloaded has reached that indicated in the first response. As such, a PCRF 3 may generate PCC rules that require the PCEF 2 to allow a user-selected QoS for the duration of this download. Then, once this download is complete, the PCEF 2 will notify the OCS 4 that it should charge for this download in accordance with the charging rate associated with the selected QoS level.

Similar functionality can be used when traffic makes use of other stateful network protocols such as File Transfer Protocol (FTP), Session Initiation Protocol (SIP) and Real Time Streaming Protocol (RTSP). When FTP is used, the PCEF can determine the data and control states by analysing the status of the service data flow. When RTP is used, requests such as play, pause or teardown can be detected with the service data flow. SIP is a text-based protocol with syntax similar to that of HTTP, such that similar methods can be used in order to detect the start and the end of a service such as Voice-over-IP call. Therefore, for all stateful protocols, the PCEF can use DPI techniques to identify the beginning and the end of traffic related to a file download, and can request that the OCS charge for download once the download has been completed.

There are some protocols where it may not be possible for the PCEF to detect the beginning and the end of some traffic consumption using DPI. For example, this may not be possible if the protocol being used is proprietary, or if the protocol attempts to mimic other protocols, or if the protocol is not yet known to the Traffic Inspection Function because it is new. In such circumstances, the Traffic Inspection Function of the PCEF could be configured to apply heuristic analysis techniques to detect patterns of behaviour that are representative of a particular protocol or application. For example, DPI may not be able to identify traffic related to peer-to-peer (P2P) protocols as eDonkey, eMule and BitTorrent. Such P2P applications split data into chunks and these chunks can be identified by using heuristic analysis. By tracking these chunks it is therefore possible to determine when the download of a file begins and ends. In addition, some applications, such as eMule, use end chunks or messages (e.g. OP_END_OF_DOWNLOAD) to indicate that the client has received all the of chunks making up a particular file. As such, the PCEF can detect the end of download chunk in order to identify when a file transfer/download has been completed.

The methods and apparatus described above provide users with the opportunity to select, at any time, the QoS level that will be provided to obtain some data, and to be charged for this traffic in dependence upon this selected QoS level.

To demonstrate the advantages provided by the methods and apparatus described above, FIG. 5A illustrates the bandwidth limitations of a standard subscription currently provided by a mobile network operator. This standard subscription allows the user a fixed maximum bandwidth throughout the day, with an increased maximum bandwidth between 8 AM and 2 PM. In comparison, FIG. 5B illustrates the bandwidth limitations that could be provided to a user when a network operator makes use of the flexible, interactive policy and charging control mechanisms described above. In FIG. 5B the standard maximum bandwidth allowed by the user's subscription is lower than that provided by the subscription illustrated in FIG. 5A, and therefore will likely have a lower standard cost. However, the user can choose to increase this maximum bandwidth in order to allow him/her to download a file or make use of a particular service, as indicated by the step-up. For the duration of this increased bandwidth, the tariff/charging rate applied is also increased. For example, this would be particularly useful if the user wanted to make use of a video streaming service. In addition, the user can also choose to decrease this maximum bandwidth, as indicated by the step-down. For the duration of this decreased bandwidth, the tariff/charging rate applied is also decreased. For example, this might be used when downloading a relatively small file that is not required in real-time.

The methods and apparatus described above provide that whenever a user participating in an IP-CAN session wishes to consume traffic of a particular type, they can select the QoS level that is to be applied for that traffic and can be charged accordingly. For example, the user could select the bandwidth that is to be applied when downloading a particular file or when making use of a particular service. Similarly, by allowing a user to select the applicable QoS level, the methods and apparatus described above also allow users to control the costs that they will incur for consuming a particular type of traffic. For example, a user could choose to pay an extra fee to download a particular file quickly, using a higher bandwidth, or could choose to reduce the cost by selecting a lower bandwidth to download the file slowly. They also allow network operators to offer a wider range of subscriptions with a greater degree of flexibility. For example, a network operator could offer a very low cost subscription that provides a low level of QoS as standard, but that enables the user to increase the available QoS on demand, when making use of particular services. Network operators could also store details of user's selections in order to determine which services and promotions should be marketed to a user.

It will be appreciated by the person of skill in the art that various modifications may be made to the above-described embodiments without departing from the scope of the present invention.

The invention claimed is:

1. A method of operating a Policy and Charging Enforcement Function (PCEF) responsible for enforcing Policy and Charging Control (PCC) rules for an internet protocol (IP) Connectivity Access Network (IP-CAN) session established for a user, the method comprising:
    enforcing first PCC rules for the IP-CAN session;
    for traffic sent over the IP-CAN session, identifying the type of traffic;
    notifying a Quality of Service (QoS) selection function of an identity of the user and the type of traffic;
    notifying the user, from the QoS selection function, of a plurality of QoS levels that can be provided to the user for the identified traffic type and a charging rate associated with each QoS level;
    receiving from the user, at the QoS selection function, a user-selected QoS level among the plurality of QoS levels;
    notifying a Policy and Charging Rules Function (PCRF), from the QoS selection function, of the identity of the user, the user-selected QoS level, the associated charging rate and the identified traffic type;
    receiving, from the PCRF, second PCC rules for the user that apply the user-selected QoS level and the associated charging rate for the identified traffic type; and
    enforcing the second PCC rules for the IP-CAN session, and in accordance with the second PCC rules, allowing the user-selected QoS level for the identified traffic type and notifying a charging server that the associated charging rate is applicable for the identified traffic type.

2. The method of claim 1, wherein the PCRF also indicates a time period for which the second PCC rules should be applied.

3. The method of claim 2, and further comprising:
    when the time period indicated by the PCRF has expired, removing the second PCC rules.

4. The method of claim 1, wherein the notification sent to the PCRF also indicates a time period for which the selected QoS level and the associated charging rate should be applied.

5. The method of claim 1, wherein a QoS level defines one or more QoS parameters.

6. The method of claim 5, wherein the one or more QoS parameters include any of:
    a QoS class identifier;
    a maximum bandwidth allowed for an uplink direction;
    a maximum bit rate allowed for the uplink direction;
    a maximum bandwidth allowed for a downlink direction;
    a maximum bit rate allowed for the downlink direction;
    a guaranteed bit rate allowed for the uplink direction; and
    a guaranteed bit rate allowed for the downlink direction.

7. A method of operating a Policy and Charging Rules Function (PCRF) responsible for determining Policy and Charging Control (PCC) rules for an internet protocol (IP) Connectivity Access Network (IP-CAN) session established for a user, the method comprising:
    receiving, at a Quality of Service (QoS) selection function from a Policy and Charging Enforcement Function (PCEF) device, an identity of a user and a type of traffic associated with the user;
    notifying the user, from the QoS selection function, of a plurality of QoS levels that can be provided to the user for the identified traffic type and a charging rate associated with each QoS level;

receiving from the user, at the QoS selection function, a user-selected QoS level among the plurality of QoS levels;

receiving, from the QoS selection function, a notification that includes the user-selected QoS level that is to be provided to the user for the identified traffic type and the associated charging rate that is to be applied to the identified traffic type;

generating PCC rules for the IP-CAN session that apply the user-selected QoS level and the associated charging rate for the identified traffic type; and sending the PCC rules generated to the PCEF responsible for enforcing the PCC rules for the IP-CAN session.

8. The method of claim 7, wherein the notification also indicates a time period for which the QoS level and the associated charging rate should be applied.

9. The method of claim 8, wherein sending the PCC rules to the PCEF includes indicating to the PCEF that the PCC rules should be applied for only the duration of the time period.

10. The method of claim 7, wherein a QoS level defines one or more QoS parameters.

11. The method of claim 10, wherein the one or more QoS parameters include any of:
a QoS class identifier;
a maximum bandwidth allowed for an uplink direction;
a maximum bit rate allowed for the uplink direction;
a maximum bandwidth allowed for a downlink direction;
a maximum bit rate allowed for the downlink direction;
a guaranteed bit rate allowed for the uplink direction; and
a guaranteed bit rate allowed for the downlink direction.

12. An apparatus configured to operate as a Policy and Charging Enforcement Function (PCEF) responsible for enforcing Policy and Charging Control (PCC) rules for an internet protocol (IP) Connectivity Access Network (IP-CAN) session established for a user, and configured to provide a Quality of Service (QoS) selection function, the apparatus comprising:
at least one processor; and
at least one memory that stores processor executable instructions, wherein the at least one processor interfaces with the at least one memory to execute the processor executable instructions, whereby said apparatus is operable to:
enforce, with the at least one processor, first PCC rules for the IP-CAN session;
identify, with the at least one processor, a type of traffic sent over the IP-CAN session;
notify, with a transmitter, the QoS selection function of an identity of a user and the identified traffic type;
receive, with a receiver of the QoS selection function the identity of the user and the identified traffic type associated with the user;
determine, with at least one processor of the QoS selection function, a plurality of QoS levels that can be provided to the user for the traffic type and a charging rate associated with each QoS level;
notify, with a transmitter of the QoS selection function, the user of the plurality of QoS levels and the associated charging rates;
receive, with the receiver of the QoS selection function, a user-selected QoS level among the plurality of Quality of Service levels;
notify, with the transmitter of the QoS selection function, a Policy and Charging Rules Function (PCRF) of the identity of the user, the user-selected QoS level, the associated charging rate, and the traffic type; and receive, with a receiver, second PCC rules for the user from the PCRF, the second PCC rules applying the user-selected QoS level and associated charging rate for the identified traffic type;

wherein the at least one processor is configured to enforce the second PCC rules for the IP-CAN session, and in accordance with the second PCC rules, to allow the user-selected QoS level for the identified traffic type and wherein the transmitter is configured to notify a charging server that the associated charging rate is applicable for the identified traffic type.

13. The apparatus of claim 12, wherein the at least one processor is further configured to allow one or more QoS parameters defined by the selected QoS level.

14. The apparatus of claim 13, wherein the at least one processor is further configured to allow one or more QoS parameters that include any of:
a QoS class identifier;
a maximum bandwidth allowed for an uplink direction;
a maximum bit rate allowed for the uplink direction;
a maximum bandwidth allowed for a downlink direction;
a maximum bit rate allowed for the downlink direction;
a guaranteed bit rate allowed for the uplink direction; and
a guaranteed bit rate allowed for the downlink direction.

15. The apparatus of claim 12, wherein the processor is further configured to remove the second PCC rules when a time period indicated by the PCRF server has expired.

16. The apparatus of claim 12, wherein the at least one processor of the QoS selection function is further configured to determine a plurality of QoS levels that each define one or more QoS parameters.

17. The apparatus of claim 16, wherein the at least one processor of the QoS selection function is further configured to determine a plurality of QoS levels that each define one or more QoS parameters that include any of:
a QoS class identifier;
a maximum bandwidth allowed for an uplink direction;
a maximum bit rate allowed for the uplink direction;
a maximum bandwidth allowed for a downlink direction;
a maximum bit rate allowed for the downlink direction;
a guaranteed bit rate allowed for the uplink direction; and
a guaranteed bit rate allowed for the downlink direction.

18. The apparatus of claim 12, further comprising a database configured to store data from which the plurality of QoS levels and associated charging rates can be determined.

19. The apparatus of claim 18, wherein the database is configured to store one or more user identities, traffic types associated with each user identity, QoS levels that can be provided for each traffic type, and a charging rate associated with each QoS level.

20. The apparatus of claim 12, wherein the at least one processor of the QoS selection function is further arranged to determine a time period for which the selected QoS level and the associated charging rate should be applied.

21. An apparatus configured to operate as a Policy and Charging Rules Function (PCRF) responsible for determining Policy and Charging Control (PCC) rules for an internet protocol (IP) Connectivity Access Network (IP-CAN) session established for a user, and configured to provide a Quality of Service (QoS) selection function, the apparatus comprising:
at least one processor; and
at least one memory that stores processor executable instructions, wherein the at least one processor interfaces with the at least one memory to execute the processor executable instructions, whereby said apparatus is operable to:

receive, with a receiver of the QoS selection function from a Policy and Charging Enforcement Function (PCEF), an identity of a user and a traffic type associated with the user;
determine, with at least one processor of the QoS selection function, a plurality of QoS levels that can be provided to the user for a traffic type and a charging rate associated with each QoS level;
notify, with a transmitter of the QoS selection function, the user of the plurality of QoS levels and the associated charging rates;
receive, with the receiver of the QoS selection function, a user selected QoS level among the plurality of QoS levels;
notify, with the transmitter of the QoS selection function, the PCRF of the identity of the user, the user-selected QoS level among the plurality of QoS levels, the associated charging rate, and the traffic type;
receive, with a receiver from the QoS selection function, a notification that includes the user-selected QoS level that is to be provided to the user for the traffic type and the associated charging rate that is to be applied to the traffic type;
generate, with the at least one processor, PCC rules for the IP-CAN session that apply the user-selected QoS level and the associated charging rate for the traffic type; and
send, with a transmitter, the PCC rules to the PCEF responsible for enforcing the PCC rules for the IP-CAN session.

22. The apparatus of claim 21, wherein the at least one processor is further configured to generate PCC rules that apply one or more QoS parameters that are defined by the QoS level.

23. The apparatus of claim 22, wherein the at least one processor is further configured to generate PCC rules that apply one or more QoS parameters that include any of:
a QoS class identifier;
a maximum bandwidth allowed for an uplink direction;
a maximum bit rate allowed for the uplink direction;
a maximum bandwidth allowed for a downlink direction;
a maximum bit rate allowed for the downlink direction;
a guaranteed bit rate allowed for the uplink direction; and
a guaranteed bit rate allowed for the downlink direction.

24. The apparatus of claim 21, wherein the at least one processor is further configured to generate an indicator that the PCC rules should be applied for only the duration of a time period.

25. The apparatus of claim 24, wherein the receiver is further configured to receive, from the QoS selection function, an indication of a time period for which the QoS level and the associated charging rate should be applied.

26. The apparatus as claimed in claim 21, wherein the at least one processor of the QoS selection function is further configured to determine a plurality of QoS levels that each define one or more QoS parameters that include any of:
a QoS class identifier;
a maximum bandwidth allowed for an uplink direction;
a maximum bit rate allowed for the uplink direction;
a maximum bandwidth allowed for a downlink direction;
a maximum bit rate allowed for the downlink direction;
a guaranteed bit rate allowed for the uplink direction; and
a guaranteed bit rate allowed for the downlink direction.

27. The apparatus of claim 21, wherein the at least one processor of the QoS selection function is further configured to determine a time period for which the selected QoS level and the associated charging rate should be applied.

* * * * *